United States Patent [19]

Ogawa et al.

[11] Patent Number: 5,161,145
[45] Date of Patent: Nov. 3, 1992

[54] OPTICAL DISC RECORDING APPARATUS

[75] Inventors: Hiroshi Ogawa, Kanagawa; Shinichiro Iimura, Tokyo, both of Japan

[73] Assignee: Sony Corporation, Tokyo, Japan

[21] Appl. No.: 564,627

[22] Filed: Aug. 8, 1990

[30] Foreign Application Priority Data

Aug. 25, 1989 [JP] Japan .................................. 1-219416

[51] Int. Cl.⁵ .............................................. G11B 7/07
[52] U.S. Cl. ..................................................... 369/59
[58] Field of Search ............................. 369/59, 54, 116

[56] References Cited

FOREIGN PATENT DOCUMENTS

0289260A2 11/1988 European Pat. Off. .
0322817A2 7/1989 European Pat. Off. .
3727681A1 3/1988 Fed. Rep. of Germany .

Primary Examiner—Vincent P. Canney
Attorney, Agent, or Firm—Philip M. Shaw, Jr.

[57] ABSTRACT

An optical disc recording apparatus for recording information signals on an optical disc having an optical recording medium with a larger than normal thermal time constant, such as an organic dyestuff base material, by irradiating the disc with a recording light modulated by signals produced by eight/fourteen modulation of information signals, is disclosed. The apparatus includes a recording pulse forming unit for forming recording pulses from the eight/fourteen modulated signals, which recording pulses are of pulse widths shorter than the eight/fourteen modulated signals by a pulse width corresponding to the elongation from the regular length of a pit formed on the recording medium on the basis of the eight/fourteen modulated signals, and an optical head supplied with the recording pulses formed by the pulse forming unit for producing the light which has been pulse width modulated by the recording pulses.

4 Claims, 4 Drawing Sheets

OPTICAL DISC RECORDING APPARATUS

BACKGROUND OF THE INVENTION

1. Field of the Invention

This invention relates to an optical disc recording apparatus wherein base band signals are recorded on an optical disc having a recording medium having a larger thermal time constant by a pulse width light modulated recording light.

2. Description of the Prior Art

A compact disc in which digital audio signals are recorded on a reproduce-only optical disc is now in widespread use. An optical disc has also been evolved in which the recording layer is formed by an optical recording medium making use of the optical or magneto-optical signal recording and reproducing principle. As an optical disc compatible with respect to the compact disc, a write-once optical disc (CD-WO) on which the information can be written only once or an overwritable magneto-optical disc (CD-MO) on which data can be rewritten is also finding practical usage and application.

The recording layer of the write-once optical disc (CD-WO) is formed by an optical recording medium, the state of which is changed by heat produced by the irradiated recording light, such as, for example, an organic dyestuff type optical recording medium.

With the optical disc recording/reproducing apparatus for recording or reading data on or from a write-once disc or an overwritable disc, as the optical disc is rotationally driven at a constant angular speed or a constant linear speed, the recording track of the optical disc is scanned by a light beam emitted by an optical head in which there are enclosed a laser diode driven by a laser driving circuit for outputting the laser light for recording and/or reproducing the information, a photodetector for detecting the irradiating laser light reflected by the optical disc, and so forth, for recording and/or reproducing the digital data.

It is known that, when the data are recorded on the optical disc of the optical disc recording and/or reproducing apparatus, the error rate depends in general on the power of the laser light used for writing the information, such that it is necessary to write the information at the optimum laser power.

When recording the CD signals on the optical discs, such as CD-WO or CD-MO, it is also necessary to produce the playback output consistent with the CD standards for assuring compatibility of the CD-WO or CD-MO with respect to the compact disc.

However, as illustrated in FIG. 1, when the baseband signals are recorded on an optical disc the recording layer of which has been formed by an optical recording medium, the state of which may be changed by heat produced by the irradiated recording light which has been light pulse width modulated by the baseband signals, a recording delay may be caused as a result of thermal time constants of the optical recording medium, with the result that the pit length on the recording layer becomes longer than the regular length corresponding to the baseband signals. That is, when the recording light having a width corresponding to the pulse width of the baseband signal is irradiated on the disc, with the baseband signal being the CD signal represented by EFM data (eight/fourteen modulated data) having pulse widths of from 3T to 11T, where T indicates a clock bit duration, a time delay $\tau_B$ which elapses between the end of irradiation of the recording light and the end of the formation of a pit $P_A$ is longer than a time delay $\tau_F$ which elapses between the stated of irradiation and the start of formation of the pit on the recording layer. The result is that the length $L_{PA}$ of the pit $P_A$ actually formed on the recording layer becomes longer than the length $L_{PO}$ of a regular pit $P_O$ corresponding to the pulse width of the baseband signals. Above all, with an optical disc having its recording layer formed by an optical recording medium having a larger than normal thermal time constant, the recording pit pattern is drastically affected by the recording delay due to thermal time constants of the optical recording medium.

Hence, with the CD-WO optical disc in which CD signals represented by the EFM data with pulse widths of from 3T to 11T are recorded on a recording medium of a larger than normal thermal time constant, the central LS of the eye pattern of the playback output is not in a correct matching state as shown in FIG. 2, while a modulation factor of 60% or more cannot be achieved with the preservation of the asymmetry in accordance with the CD standards unless recording is made at an excess power. On the other hand, a recording layer formed by an organic dyestuff base optical recording medium has a larger time constant and tends to be increased in push-pull on pit formation, such that, should recording be made at an excess power, it becomes extremely difficult to maintain the push-pull (mean value) according to the CD standards within the range of from 0.04 to 0.07.

SUMMARY AND OBJECT OF THE INVENTION

It is therefore a principal object of the present invention to provide an optical disc recording apparatus according to which recording in accordance with the CD standards may be performed on an optical disc having a recording medium of a large thermal time constant, such as an organic dyestuff base optical recording medium.

It is another object of the present invention to provide an optical disc recording apparatus wherein the recording light which has been light pulse width modulated by the baseband signals is irradiated on an optical disc having a recording medium with a large thermal time constant for forming a pit of a regular length corresponding to the base band signals on the optical disc.

For accomplishing the above objects, the present invention provides an optical disc recording apparatus in which the light pulse width modulated recording light is irradiated on an optical disc having a large thermal time constant for recording the baseband signals on the optical disc, comprising recording pulse forming means whereby recording pulses are formed from baseband signals, with the recording pulses being shorter in duration than the baseband signals by an amount corresponding to the elongation of the pit from the regular length of the pit formed on a standard optical disc, are formed from the baseband signals, wherein the baseband signals are recorded by the recording light which has been light pulse width modulated by the recording pulses formed by the recording pulse forming means.

With the optical disc recording apparatus of the present invention, recording pulses which are shorter in duration by an amount corresponding to the elongation from the regular length of a pit formed in association with the baseband signals on a regular optical disc are formed by recording pulse forming means. A recording light which has been light pulse width modulated by these recording pulses is used for recording the baseband signals on an optical disc having a recording medium with a larger than normal thermal time constant.

With the optical disc recording apparatus of the present invention, the recording pulse has a pulse width shorter in duration by an amount necessary to compensate for the pit elongation due to thermal time constants of the optical recording medium.

The recording light which has been light pulse width modulated by this shortened recording pulse is irradiated on the optical disc having a larger thermal time constant to form pits having regular lengths corresponding to the baseband signals on the optical disc.

Thus, in accordance with the present invention, a recording may be made on an optical disc having a recording medium with a large thermal time constant such as an organic dyestuff base optical recording medium and still comply with the CD standards.

The above and other objects as well as the novel features of the present invention will become more apparent from the following description which is made with reference to the accompanying drawings and the new matter pointed out in the claims.

DETAILED DESCRIPTION OF THE PREFERRED EMBODIMENT

Figure 1:
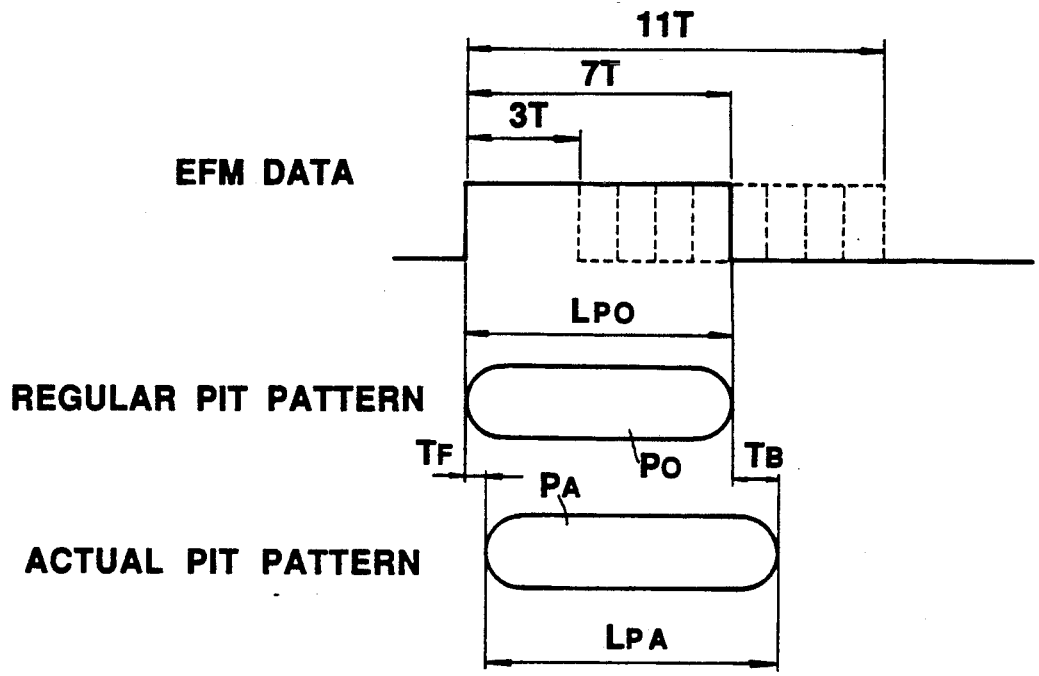
FIG. 1 shows a pit pattern formed on an optical disc by a conventional optical disc recording apparatus.
Figure 2:
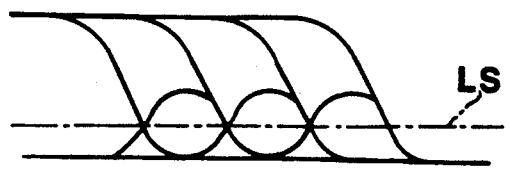
FIG. 2 shows an eye pattern of the playback output of the pit pattern shown in FIG. 1.

By referring to the drawings, an optical disc recording apparatus according to the present invention will be explained in detail.

Figure 3:
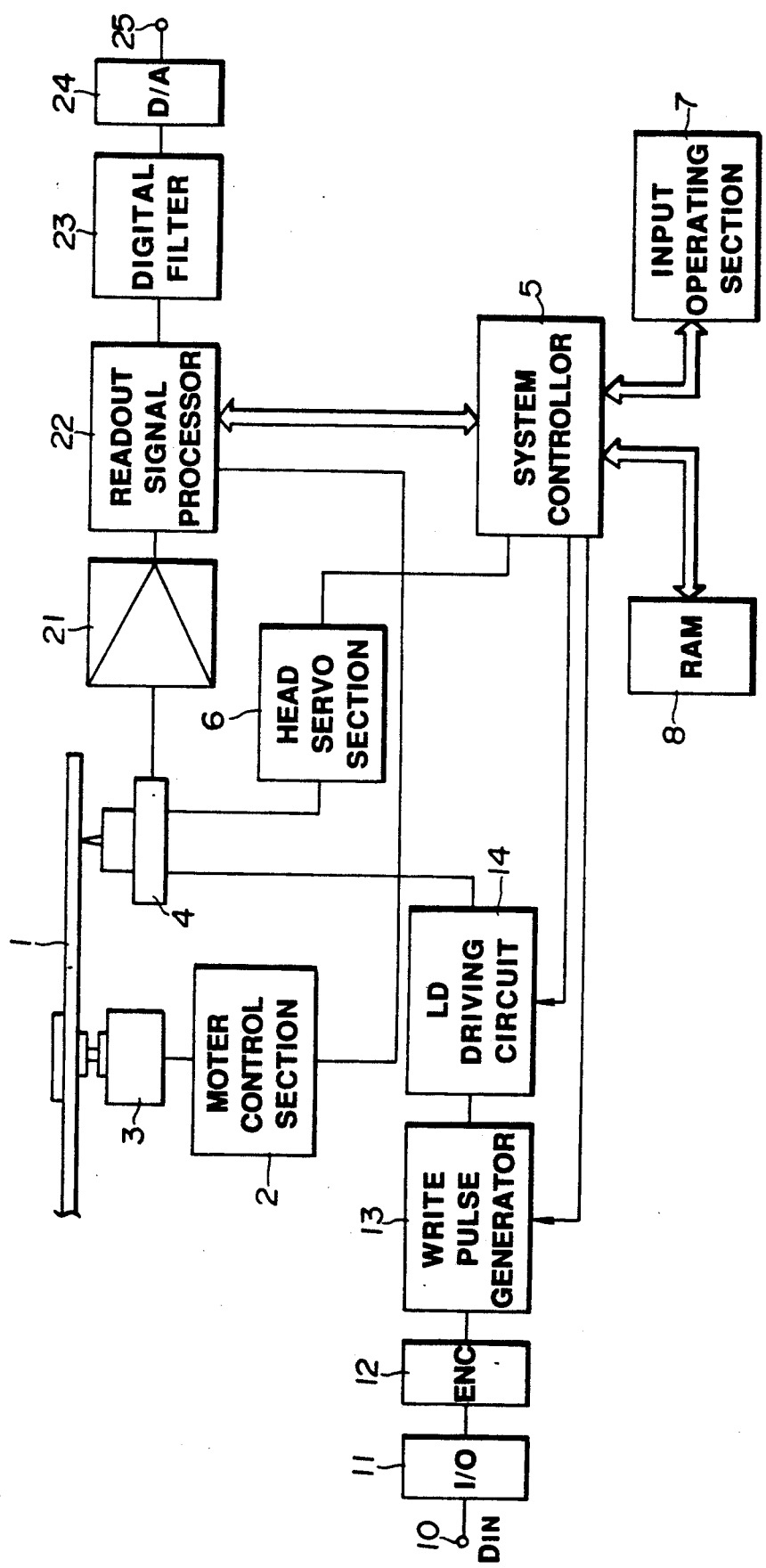
FIG. 3 is a block diagram showing the arrangement of a recording/reproducing system of an optical recording and/or reproducing apparatus to which the present invention in applied.

In FIG. 3, there is shown in a block diagram the construction of a recording/reproducing system when the present invention is applied to an optical disc recording/reproducing apparatus in which digital data is optically recorded and/or reproduced in accordance with the data format consistent with the CD standards.

The overall construction of the optical disc recording/reproducing apparatus is first explained with reference to FIG. 3.

With the optical disc recording/reproducing apparatus, shown in FIG. 3, digital data are optically recorded and/or reproduced on or from a write-once optical disc 1 formed of an organic dye base optical recording medium having a large thermal constant, in accordance with the data format consistent with the CD standards.

The optical disc 1 is driven into rotation at a predetermined r.p.m. by means of a spindle motor 3 under control by a motor control unit 2. With the optical disc 1, the recording and reading of the digital data in accordance with the data format consistent with the CD standards is performed by an optical head 4 operating as optical information recording and reading means.

The optical head 4 has enclosed therein a laser diode driven by a laser driving circuit 14, as later described, to effect irradiation of an information recording and reading laser beam, and a photodetector for detecting the laser light irradiated by the laser diode and reflected by the optical disc 1, or the like. The optical head 4 is moved as a whole along the radius of the disc 1. The optical head 4 is so designed that the recording track on the optical disc 1 is scanned by the laser light output from the laser diode whilst a focusing servo and a tracking servo are continuously operated by the head servo circuit 6 which is driven and controlled by a system controller 5.

The recording system of the optical disc recording-/reproducing apparatus includes an encoder 12 for converting digital data $D_{IN}$ supplied via an input/output interface 11 and an input terminal 10 to be recorded into a record data string of a data format consistent with the CD standards, a recording pulse generator 13 for affording writing pulses corresponding to the record data string to the laser drive circuit 14, and the like. The laser diode of the optical head 4 is pulse-driven by recording pulses corresponding to the record data string by the laser drive circuit 14 for recording the digital data $D_{IN}$ on the recording track of the optical disc 1 as the record data string having the data format consistent with the CD standards.

The reproducing system of the optical disc reproducing apparatus includes, above all, a readout signal processor 22 to which information readout signals obtained at the optical disc 1 as the detection output of the photodetector of the optical head 4 are supplied by means of an amplifier 21. The readout signal processor 22 performs a decoding operation corresponding to the encoding operation by the encoder 12 of the recording system on the information readout signals supplied from the optical head 4, to reproduce play or address data corresponding to the recorded contents on the disc 1. The play data reproduced at the readout signal processor 22 are filtered in a desired manner by a digital filter 23 and thence supplied to a digital to analog converter 24. The converter 24 causes the play data to be converted into corresponding analog signals which are output as reproduced audio signals at output terminal 25.

The address data or the like, reproduced by the readout signal processor 22, are supplied to the system controller 5.

To this system controller 5, there are connected an input operating section 7 for setting operational modes for the optical disc recording and/or reproducing apparatus and a random access memory 8 for storage of a variety of control data or the like. The system controller 5 controls the operations of the head servo section 6, recording pulse generator 13, laser driving circuit 14 and the readout signal processor 22 under the operational mode preset by the input operating section 7.

With the recording system in the optical disc recording and/or reproducing apparatus, that is the optical disc recording apparatus of the present invention, the CD signal is obtained by conversion at the encoder 12 of digital data $D_{IN}$ supplied at the input terminal 10 via input/output interface 11. This CD signal is represented by the record data string having the data format consistent with the CD standards, that is the EFM data having pulse widths of from 3T to 11T, T designating the clock bit interval. The CD signal is directly used at the recording pulse generator 13 as the recording pulses for pulse width modulation of the laser diode of the optical head 4 by the laser driving circuit 14 to produce the recording laser light which is then irradiated on the optical disc 1. As will be explained further, the recording pulse is generated to have a pulse width shorter by an amount corresponding to the elongation from the regular length of the pit formed on the disc 1 and is used for recording.

Figure 4:
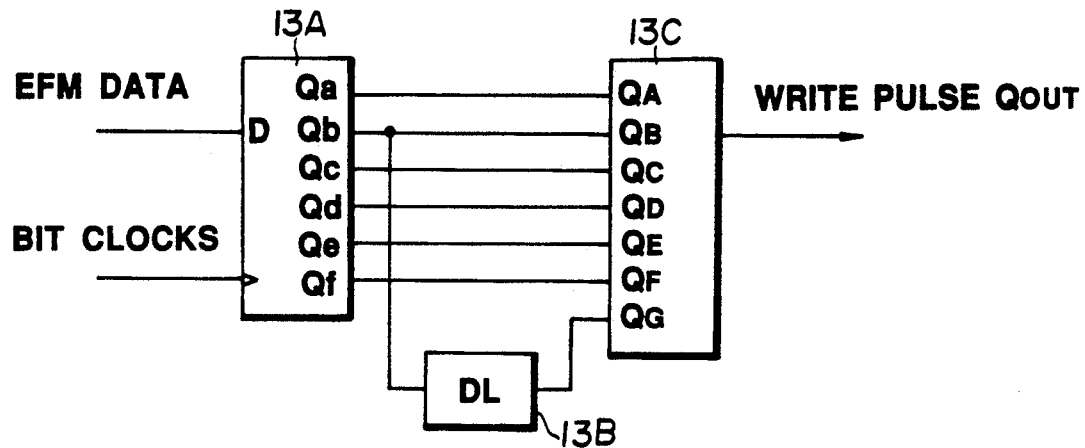
FIG. 4 is a block diagram showing a concrete construction of a recording pulse generator of the optical disc recording apparatus according to the present invention.
Figure 5:
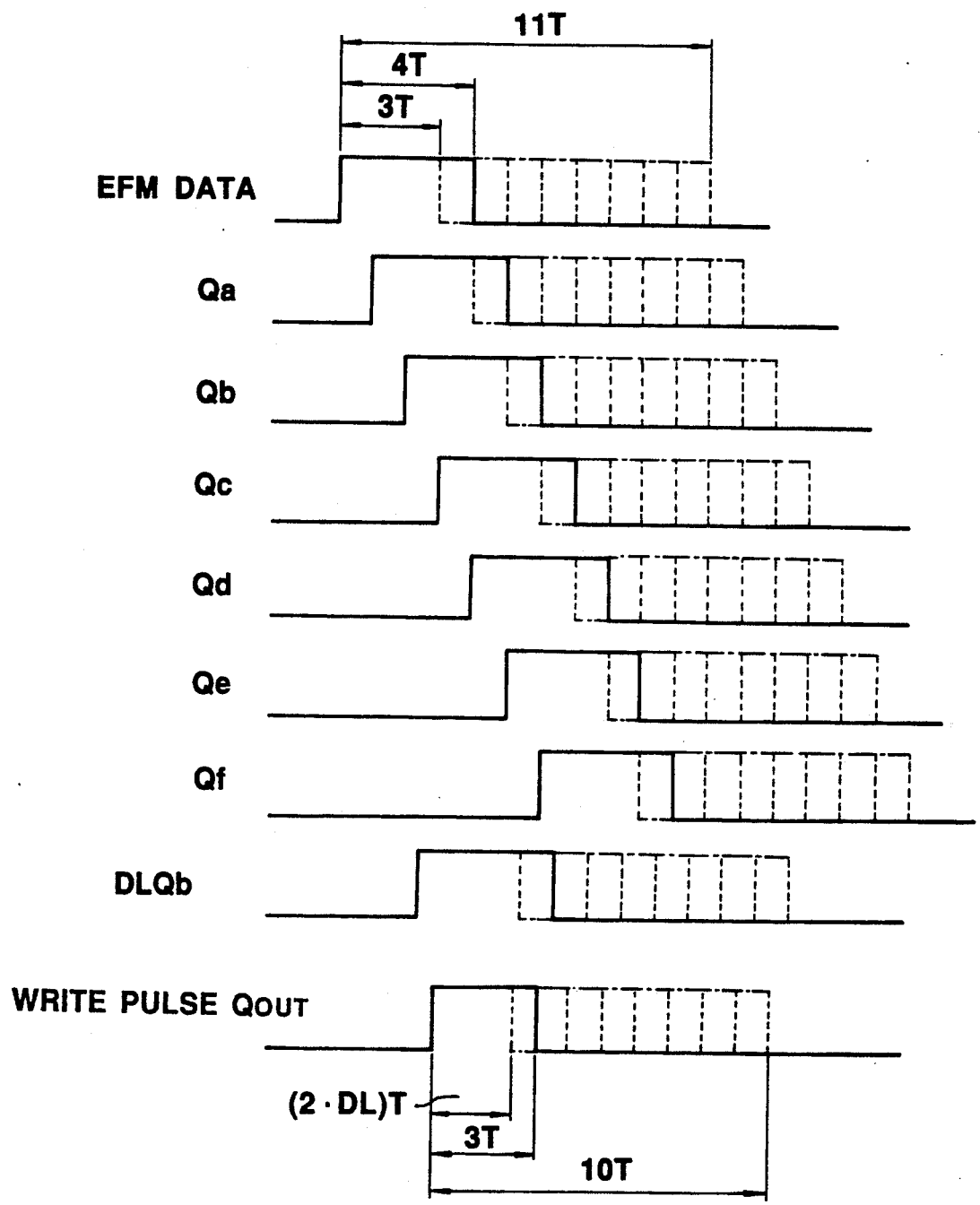
FIG. 5 is a time chart showing the operation of the recording pulse generator.

Referring to FIG. 4 showing the concrete construction of the recording pulse generator 13, the generator 13 includes a 6 bit output shift register 13A, to a data input terminal of which the above mentioned EFM data are supplied, and a 7 bit input encoder 13C to which 6 bit output data $Q_a$, $Q_b$, $Q_c$, $Q_d$, $Q_e$ and $Q_f$ from the shift register 13A are directly input as the first to sixth bit input data $Q_A$, $Q_B$, $Q_C$, $Q_D$, $Q_E$ and $Q_F$ and to which the second bit output data $Q_b$ of the shift register 13A is input as the seventh bit input $Q_G$ by means of a delay circuit 13B. The shift register 13A has its data input terminal supplied with EFM data from the encoder 12 and its clock input terminal supplied with bit clocks for the EFM data. As shown in FIG. 5, the shift register 13A outputs 6 bit output data $Q_a$, $Q_b$, $Q_c$, $Q_d$, $Q_e$ and $Q_f$ which are the EFM data sequentially shifted each by one clock bit period T by bit clocks. The delay circuit 13B affords a delay of the order of 20 to 40 nsec to the second bit output data $Q_b$ of the shift register 13A. The delay output data $DLQ_b$, obtained by means of the delay circuit 13B, is supplied as the seventh bit input $Q_c$ to the 7 bit input encoder 13C. The encoder 13C is constituted by a programmable logic array for performing a converting operation of $$Q_{OUT} = Q_B \cdot Q_C (Q_B \cdot Q_C \cdot Q_D \cdot Q_E \cdot Q_F) +$$
$$Q_G \cdot Q_C \cdot (Q_B \cdot Q_C \cdot Q_D \cdot Q_E \cdot Q_F)$$
$$= Q_b \cdot Q_c \cdot (Q_b \cdot Q_c \cdot Q_d \cdot Q_e \cdot Q_f) +$$
$$DLQ_b \cdot Q_c (Q_b \cdot Q_c \cdot Q_d \cdot Q_e \cdot Q_f)$$

By such conversion, the encoder 13c processes the EFM data having pulse widths of from 4T to 11T to generate recording pulses $Q_{OUT}$ with pulse widths of $(n-1)T$ from the EFM data with pulse widths of nT, while generating a recording pulse $Q_{OUT}$ with a pulse width of $(2+DL)T$ from the EFM data with a minimum transition distance $T_{MIN}$ equal to 3T.

The laser driving circuit 14 performs a pulse width modulation on the laser diode of the optical head 4 by a recording pulse $Q_{OUT}$ generated by the write pulse generator 13. In this manner, the recording laser light is produced by pulse width modulation of the laser diode of the optical head 4 and irradiated on the optical disc 1 to form pits having lengths corresponding to pulse widths of the recording pulses $Q_{OUT}$ on the optical disc 1 for recording.

Figure 6:
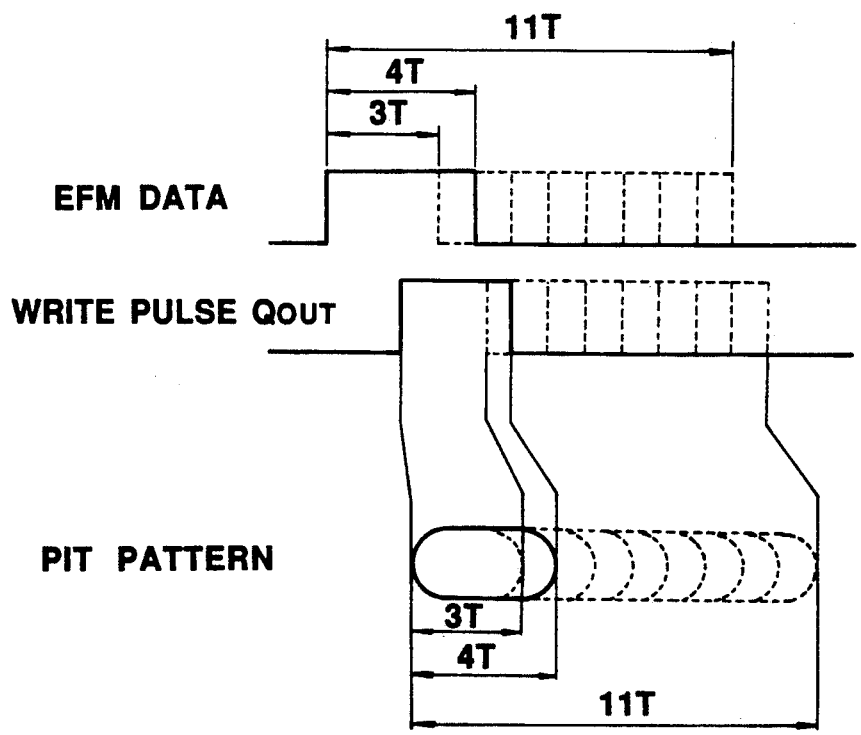
FIG. 6 shows a pit pattern formed on the optical disc by the optical disc recording apparatus according to the present invention.

Tests have been conducted for generating recording pulses $Q_{OUT}$ from the EFM data having the pulse widths of from 4T to 11T so that the recording pulses $Q_{OUT}$ are unanimously shorter by one clock bit distance than the corresponding EFM data, and recording the recording pulses thus produced on the optical disc formed by the organic dyestuff base optical recording medium. It has been shown that, as a result of pit elongation due to the thermal time constants of the optical recording medium, pits having the regular pit lengths of from 4T to 11T can be formed, as shown in FIG. 6. As regards the EFM data having the minimum transition distance $T_{MIN}=3T$, it has been shown that a pit having minimum pit distance of 3T consistent with the CD standards can be formed by forming a recording pulse $Q_{OUT}$ having a pulse width of $(2+DL)T$ which is longer by about 20 to 40 nsec than the pulse width shorter by one bit distance T than 3T, and using the thus produced recording pulse for recording.

With the above described optical recording and/or reproducing apparatus, a satisfactory recording with a duty cycle close to 50% can be stably made on the optical disc 1 formed by the organic dyestuff base optical recording medium, such that a pit can be formed in accordance with the CD standards with a push pull value of not more than 0.07% and a modulation factor of not less than 60% under maintenance of asymmetry. The readout laser beam having the same beam spot diameter as that of the recording laser beam is irradiated by the optical head 4 on the optical disc 1 for reading out the information to reproduce the data at the readout signal processor 22 at approximately the same error rate as that of the conventional CD dedicated to signal reproduction.

What is claimed is:

1. An optical disc recording apparatus for recording information data by irradiating an optical disc having a recording medium having a large thermal time constant with a recording light derived from baseband signals of eight/fourteen modulated (EFM) data having pulse widths of nT, where T designates a predetermined clock bit interval and n is an integer between 3 and 11, said apparatus comprising
    recording pulse forming means for forming recording pulses having pulse widths of $(n-1)T$ for $4 \leq n \leq 11$ and $(2+DL)T$, where DL is a predetermined time delay, for $n \leq 3$, and
    an optical head recording means supplied with the recording pulses formed by said pulse forming means for producing the recording light which has been light pulse width modulated by said recording pulses.

2. An optical disc recording apparatus according to claim 1, wherein the recording pulse forming means includes a delay circuit having an input terminal, an output terminal, and a delay of the period DL, a six bit output shift register having an input for receiving the EFM data, a clock input for receiving bit clocks having a period T from an external source, and six outputs $Q_a$, $Q_b$, $Q_c$, $Q_d$, $Q_e$, $Q_f$, which are the EFM data sequentially shifted each by one clock bit period T by bit clocks, with the output $Q_b$ being supplied to the input of the delay circuit, and a seven bit input encoder having six inputs, each input being separately connected to a corresponding output $Q_a$ to $Q_f$ of the output shift register, and a seventh input connected to the output of the delay circuit, and wherein the encoder produces a recording pulse $$Q_{OUT} = Q_b \cdot Q_c (Q_b \cdot Q_c \cdot Q_d \cdot Q_e \cdot Q_f) + DLQ_b \cdot Q_c (Q_b \cdot Q_c \cdot Q_d \cdot Q_e \cdot Q_f)$$

3. An optical disc recording apparatus according to claim 1, wherein the recording medium is an organic dyestuff type optical recording medium.

4. A optical recording apparatus for recording baseband signals of eight/fourteen data having pulse widths of nT, where T designates a predetermined clock bit interval and n is an integer between 3 and 11, on an optical recording medium by irradiating said recording medium with a light pulse width modulated recording light, said apparatus comprising recording pulse forming means supplied with the baseband signals for forming recording pulses having pulse widths of $(n-1)T$ for $4 \leq n \leq 11$ and $(2+DL)T$, where DL is a predetermined time delay, for $n \leq 3$, and means supplied with the recording pulses for light pulse width modulating the irradiating light beam with the recording pulses formed by said recording pulse forming means.

* * * * *